(12) United States Patent
Aoki (10) Patent No.: US 9,915,326 B2
(45) Date of Patent: Mar. 13, 2018

(54) BELT MOUNTING TOOL

(71) Applicant: Mitsuboshi Belting Ltd., Nagata-ku, Kobe-shi, Hyogo (JP)

(72) Inventor: Yasuhito Aoki, Kobe (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 74 days.

(21) Appl. No.: 14/899,968

(22) PCT Filed: Jun. 19, 2014

(86) PCT No.: PCT/JP2014/066235
§ 371 (c)(1),
(2) Date: Dec. 18, 2015

(87) PCT Pub. No.: WO2014/203950
PCT Pub. Date: Dec. 24, 2014

(65) Prior Publication Data
US 2016/0138686 A1 May 19, 2016

(30) Foreign Application Priority Data

Jun. 19, 2013 (JP) .................................. 2013-128410
Jun. 13, 2014 (JP) .................................. 2014-122363

(51) Int. Cl.
*F16H 7/22* (2006.01)
*F16H 7/24* (2006.01)

(52) U.S. Cl.
CPC ...................................... *F16H 7/24* (2013.01)

(58) Field of Classification Search
CPC .... F16H 7/24; F16H 7/00; F16G 5/20; D01H 1/241; Y10T 29/53909
(Continued)

(56) References Cited

U.S. PATENT DOCUMENTS 490,546 A * 1/1893 Donkin ..................... F16H 7/24
474/130
654,052 A * 7/1900 Cliff et al. ................ F16H 7/24
474/130
(Continued)

FOREIGN PATENT DOCUMENTS

CN 1471614 A 1/2004
CN 1751191 A 3/2006
(Continued)

OTHER PUBLICATIONS

Jun. 7, 2016—(JP) Notification of Reasons for Refusal—App 2014-122363.
(Continued)

*Primary Examiner* — Henry Y Liu
(74) *Attorney, Agent, or Firm* — Banner & Witcoff, Ltd.

(57) ABSTRACT

The present invention relates to a belt installation tool which is to be installed so as to cover at least a part of a first side surface of a pulley, including an attaching part attached along an outer peripheral part of the pulley, an installation part brought into contact with at least a part of the first side surface, a protection part covering at least a part of the first side surface without coming into contact therewith, and a belt holding part protruding on the protection part or on the installation part, in which the protection part covers at least a part of a part having a largest distance in a vertical direction in an area located inside the part with which the installation part comes into contact in the first side surface.

7 Claims, 12 Drawing Sheets

(58) Field of Classification Search
USPC .......................................................... 474/130
See application file for complete search history.

(56) References Cited

U.S. PATENT DOCUMENTS

| | | | | |
|---|---|---|---|---|
| 680,063 | A * | 8/1901 | Montgomery et al. ... | F16H 7/24 474/130 |
| 2,141,505 | A * | 12/1938 | Bobrzyk ................ | D01H 1/241 474/130 |
| 2,195,359 | A * | 3/1940 | Orval ........................ | F16H 7/24 474/130 |
| 4,111,063 | A * | 9/1978 | Journey .................... | F16H 7/24 474/130 |
| 6,402,649 | B1 * | 6/2002 | Amkreutz ................. | F16H 7/24 474/130 |
| 6,692,391 | B2 * | 2/2004 | Gerring .................... | F16H 7/24 254/250 |
| 6,783,473 | B2 * | 8/2004 | De Meester .............. | F16H 7/24 474/130 |
| 7,211,015 | B2 * | 5/2007 | Shaw ........................ | F16H 7/24 474/130 |
| 7,247,110 | B2 * | 7/2007 | Winninger ................ | F16H 7/24 474/130 |
| 8,397,363 | B2 * | 3/2013 | Fukatani ................... | F16H 7/24 269/1 |
| 8,684,871 | B2 * | 4/2014 | Mitchell ................... | F16H 7/24 474/130 |
| 2002/0103048 | A1 * | 8/2002 | Amkreutz ................. | F16H 7/24 474/130 |
| 2002/0107098 | A1 * | 8/2002 | Amkreutz ................. | F16H 7/24 474/130 |
| 2003/0176248 | A1 * | 9/2003 | De Meester .............. | F16H 7/24 474/130 |
| 2003/0211910 | A1 * | 11/2003 | Gerring .................... | F16H 7/24 474/130 |
| 2004/0002400 | A1 * | 1/2004 | Ellis ......................... | F16H 7/24 474/130 |
| 2004/0063530 | A1 * | 4/2004 | De Meester .............. | F16H 7/24 474/130 |
| 2005/0164815 | A1 * | 7/2005 | Winninger ................ | F16H 7/24 474/130 |
| 2005/0170923 | A1 * | 8/2005 | Hodjat ...................... | F16H 7/24 474/130 |
| 2005/0221933 | A1 * | 10/2005 | Shaw ........................ | F16H 7/24 474/130 |
| 2005/0221934 | A1 * | 10/2005 | Shaw ........................ | F16H 7/24 474/130 |
| 2006/0009322 | A1 * | 1/2006 | Fletcher ................... | F16H 7/24 474/130 |
| 2010/0048335 | A1 * | 2/2010 | Debuire ................... | F16H 7/24 474/130 |

FOREIGN PATENT DOCUMENTS

| | | |
|---|---|---|
| JP | 2005-534867 | 11/2005 |
| JP | 2007-120678 A | 5/2007 |
| JP | 2009-222101 A | 10/2009 |
| JP | 2010-179717 A | 8/2010 |
| JP | 2012-082950 A | 4/2012 |
| WO | 2008/125461 A1 | 10/2008 |

OTHER PUBLICATIONS

Mar. 2, 2017—(EP) Search Report—App 14813793.8.
Apr. 1, 2017—(CN) Notification of First Office Action—App 201480035110.X.
Sep. 22, 2014—International Search Report—Intl App PCT/JP2014/066235.
Dec. 20, 2016—(JP) Decision of Refusal—App 2014-122363.
Nov. 14, 2017—(JP) Notification of Reasons for Refusal—App 2014-122363.
Dec. 4, 2017—(CN) Notification of the Second Office Action—App 201480035110.X.
Jan. 18, 2018—(EP) Office Action—App 14813793.8.

* cited by examiner

BELT MOUNTING TOOL

CROSS REFERENCE TO RELATED APPLICATIONS

This is a U.S. National Phase Application under 35 U.S.C. § 371 of International Application No. PCT/JP2014/066235, filed Jun. 19, 2014, which claims priority to Japanese Application Nos. 2013-128410 and 2014-122363, filed Jun. 19, 2013 and Jun. 13, 2014, respectively, the entire disclosures of which are incorporated herein by reference.

TECHNICAL FIELD

The present invention relates to a belt installation tool used when a belt is wound on a plurality of pulleys.

BACKGROUND ART

Generally, in a belt driving mechanism in which a belt is wound on a plurality of pulleys, a circumferential length of the belt is shortened compared with a circumferential length of a layout between the pulleys as an attaching object so as to apply high tension to the belt in order to reliably transmit a power between the pulleys.

An operation that such a belt whose circumferential length is shorter than the circumferential length of the layout between the pulleys is wound on the pulleys may require a power against a tension of the belt and take time and labor in some cases. To reduce the time and labor, Patent Literature 1 discloses a tool which extends a belt in a circumferential direction to support an operation for winding it on an outer periphery of a pulley.

The Patent Literature 1 discloses a very compact belt installation tool which lowers the belt tension acting during an attachment of the belt between pulleys to improve an attaching property. Such a belt installation tool is excellent in its portability and can be arranged in the pulleys with various configurations, and therefore is useful.

Further, when the belt installation tool disclosed in the Patent Literature 1 is arranged on pulleys having no protrusions (the pulleys having relatively flat side surfaces) on side surfaces of the pulleys to attach a belt between the pulleys, a possibility is extremely low that the belt or the pulleys may be damaged.

CITATION LIST

Patent Literature

Patent Literature 1: JP-A-2012-82950
Patent Literature 2: JP-A-2010-179717

SUMMARY OF INVENTION

Problem that the Invention is to Solve

Figure 12:
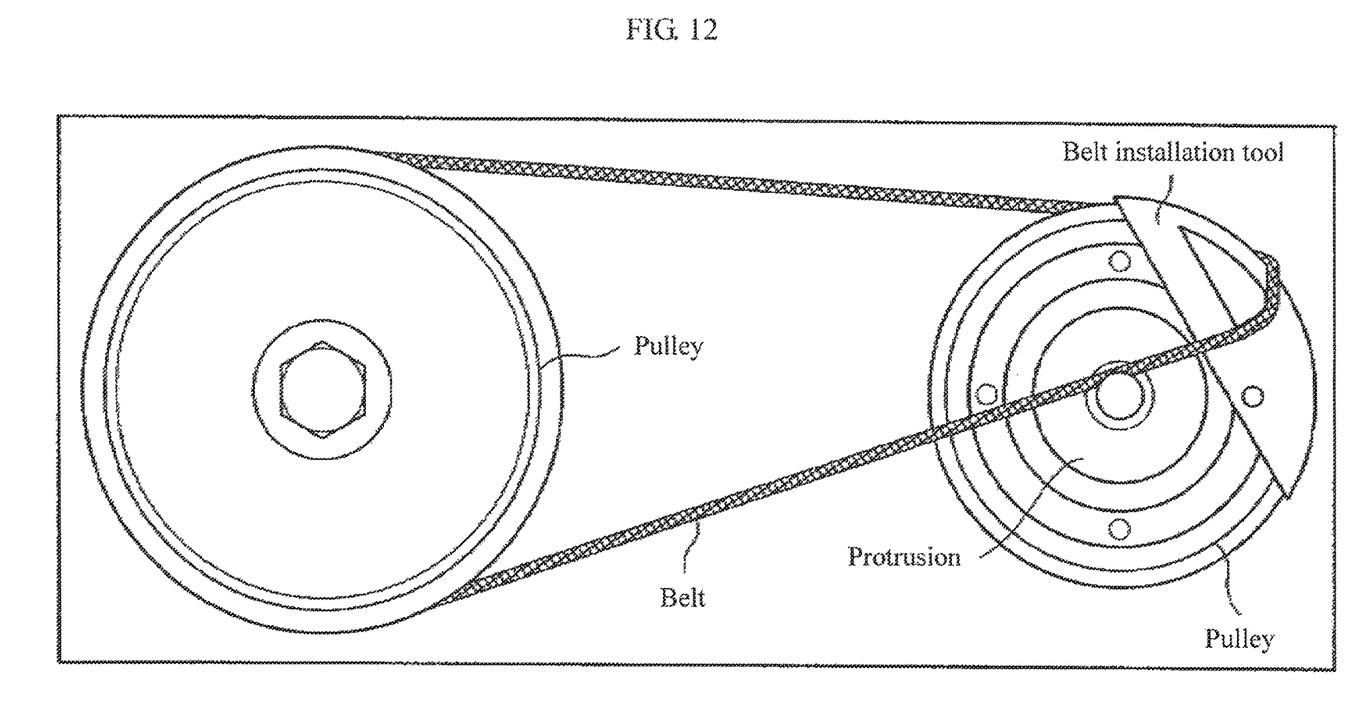
FIG. 12 is an explanatory view of a conventional belt installation tool.

However, when the belt installation tool disclosed in the above-described Patent Literature 1 is arranged on pulleys having protrusions on side surfaces of the pulleys to attach a belt between the pulleys, there is a possibility that the belt may come into contact with the protrusions to damage the belt or the pulleys (see FIG. 12).

For instance, in the case of a compressor pulley, a clutch hub of a magnet clutch is fitted to a shaft of a compressor. When the compressor is not driven, only the pulley is rotated. However, when an air conditioner switch is turned on, an electric current is supplied to a coil embedded in a stator, which becomes a strong magnet to strongly attract the clutch hub, which is allowed to be press-bonded against the pulley, and the compressor is rotated. The clutch hub of the pulley protrudes from a side surface of the pulley. During an attachment of a belt, since the belt is pressed against the protruding clutch hub (a protrusion) of the compressor pulley to harshly interfere with the pulley, not only the belt, but also the pulley itself including the clutch hub may be damaged in some cases (see Patent Literature 2).

Thus, the present invention is made to solve the problems as described above, and provides a belt installation tool by which a belt can be smoothly attached without interfering with a protrusion even when the belt is wound on the pulley having the protrusion on a side surface of the pulley and a damage of the belt or the pulley itself due to a contact of the protrusion and the belt can be prevented.

Means for Solving the Problems

One embodiment of the present invention for solving the above-described problems is a belt installation tool which is to be installed so as to cover at least a part of a first side surface of a pulley, which the belt installation tool includes:

an attaching part which is attached along an outer peripheral part of the pulley, an installation part which is brought into contact with at least a part of the first side surface of the pulley, a protection part which covers at least a part of the first side surface without coming into contact with the first side surface of the pulley, and a belt holding part which protrudes on the protection part near the outer peripheral part of the pulley, or on the installation part, in which the protection part covers at least a part of a part having a largest distance in a vertical direction from a plane defined by a part with which the installation part comes into contact in the first side surface in an area located inside the part with which the installation part comes into contact in the first side surface of the pulley.

According to the above-described configuration, since the attaching part is attached along the outer peripheral part of a pulley and the installation part is allowed to come into contact with a part of the first side surface of the pulley and fixed, the belt installation tool can be stably installed on the pulley.

Further, since the protection part covers at least a part of a part which has a largest distance in the vertical direction from a plane defined by a part with which the installation part comes into contact in the first side surface in an area located inside the part with which the installation part comes into contact in the one side surface of the pulley (including a case where the distance from the plane defined by the part with which the installation part comes into contact in the first side surface is 0), at the time when a belt is wound on the pulley, the part having the largest distance in the vertical direction from the plane defined by the part with which the installation part comes into contact in the first side surface can be prevented from interfering with the belt and the part having the largest distance in the vertical direction from the plane defined by the part with which the installation part comes into contact in the first side surface and the belt can be protected.

Further, since the belt holding part protrudes near the outer peripheral part of the pulley on the protection part, or on the installation part, the belt holding part does not protrude outside (outside in the radial direction) from the outer peripheral part of the pulley. Thus, it can be used even in the case where there is no room in a physical space in the outer peripheral part side of a pulley.

When the belt installation tool is installed on a pulley and a belt is transferred to an outer peripheral part of the pulley from a state that the belt is wound on the belt holding part, the belt can be smoothly slid on the protection part and transferred. Thus, when the belt is transferred to the outer peripheral part of the pulley from the state that the belt is wound on the belt holding part, the belt is prevented from being interfered with the part having the largest distance in the vertical direction from the plane defined by the part with which the installation part comes into contact in the first side surface of the pulley and the belt or the pulley itself can be prevented from being damaged.

Further, according to one embodiment of the present invention for solving the above-described problem, in the belt installation tool, the installation part is connected to the protection part in a stepped form.

According to the above-described configuration, since the protection part is connected to the installation part in the stepped form so that a gap is formed by the step between the part having the largest distance in the vertical direction from the plane defined by the part with which the installation part comes into contact in the first side surface and the protection part, the protection part does not come into contact with the part having the largest distance in the vertical direction from the plane defined by the part with which the installation part comes into contact in the first side surface and can reliably cover the part.

Further, according to one embodiment of the present invention for solving the above-described problem, in the belt installation tool, the attaching part has a circular arc form so as to extend along the outer peripheral part of the pulley.

According to the above-described configuration, since the attaching part is configured in the circular arc form so as to extend along the outer peripheral part of the pulley, the belt installation tool can be stably attached to the outer peripheral part of the pulley.

Further, according to one embodiment of the present invention for solving the above-described problem, in the belt installation tool, the attaching part is further provided with a rib part which is fitted to a groove part provided in the outer peripheral part of the pulley.

According to the above-described configuration, since the attaching part is provided with the rib part which fits to the groove part provided in the outer peripheral part of the pulley, the belt installation tool can be more stably attached to the outer peripheral part of the pulley.

Further, according to one embodiment of the present invention for solving the above-described problem, in the belt installation tool, the attaching part has a circular arc length formed to have a central angle being within a range of 30 to 120°.

When the circular arc length of the attaching part is formed to have a central angle smaller than 30°, the circular arc length of the attaching part is relatively short to an outer peripheral length of the pulley, so that the installation of the belt installation tool on the pulley may not be stable in some cases. On the other hand, when the circular arc length of the attaching part is formed to have a central angle exceeding 120°, the circular arc length of the attaching part is relatively long to the outer peripheral length of the pulley, so that the installation or disinstallation of the belt installation tool on or from the pulley is not easy.

Thus, as described above, when the circular arc length of the attaching part is formed to have a central angle within a range of 30 to 120°, the installation or disinstallation of the belt installation tool on or from the pulley can be made easy while stabilizing the installation of the belt installation tool on the pulley.

Further, according to one embodiment of the present invention for solving the above-described problem, in the belt installation tool, the pulley has a protrusion on the first side surface and the protection part covers at least a part of the protrusion.

According to the above-described configuration, since the protection part covers the protrusion, the protrusion is prevented from interfering with the belt when the belt is wound on the pulley, so that the protrusion and the belt can be protected.

Advantageous Effects of Invention

The belt installation tool can be provided by which even when a belt is wound on a pulley having a protrusion on a side surface of the pulley, the belt can be smoothly attached without interfering with the protrusion and a damage of the belt or the pulley itself due to a contact of the protrusion and the belt can be prevented.

MODE FOR CARRYING OUT THE INVENTION

Embodiments

By referring to the drawings, an embodiment of the present invention will be described below. A belt installation tool 9 according to the present embodiment is used when a V-ribbed belt 4 which is extensible in a direction of a circumferential length is wound between a first pulley 2 and a second pulley 3 as illustrated in FIG. 1.

Figure 1:
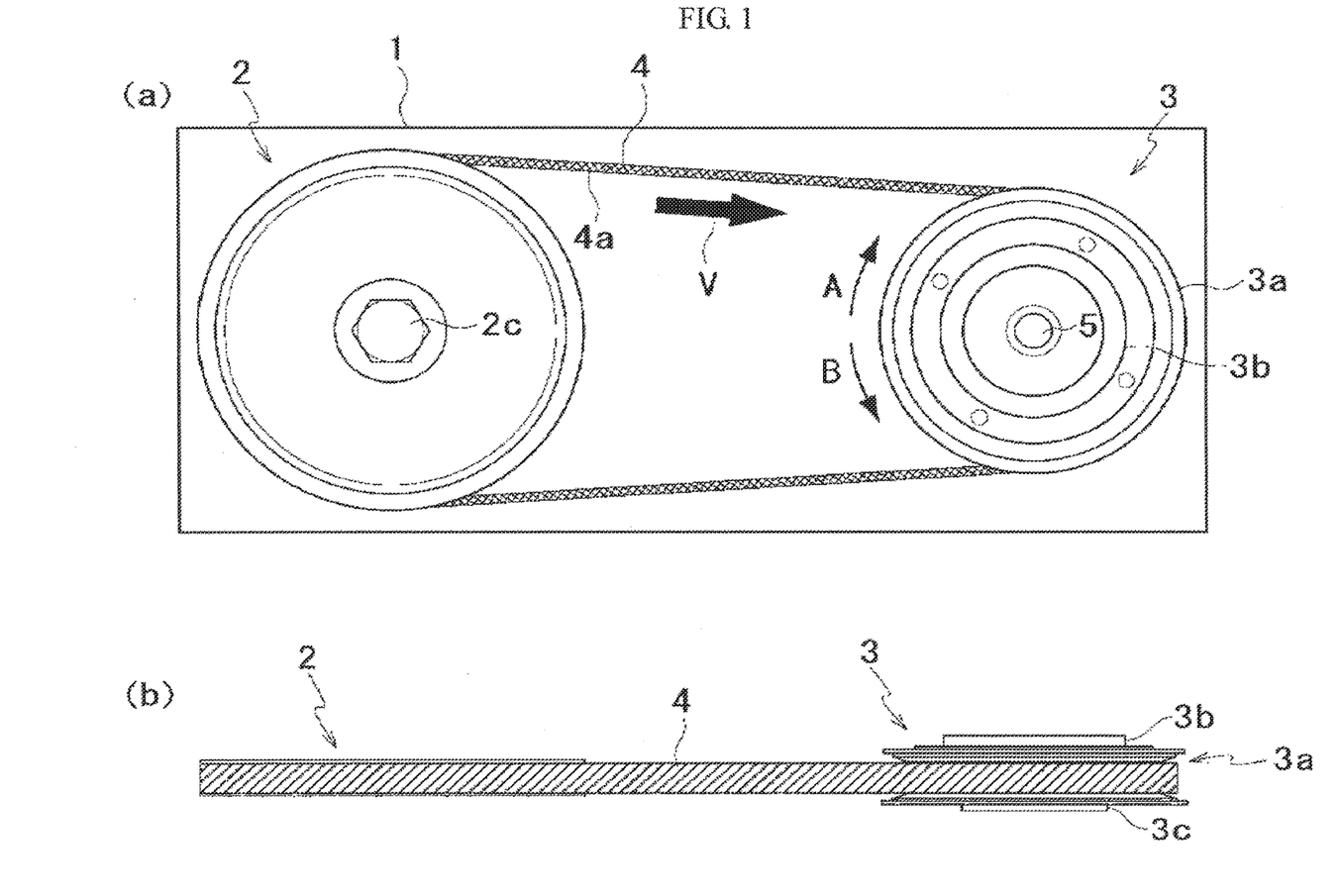
FIG. 1 (a) and (b) of FIG. 1 are explanatory views of a first pulley and a second pulley arranged in a casing.

As illustrated in (a) and (b) of FIG. 1, in a casing 1, the first pulley 2 connected to a crank shaft of an engine or the like and the second pulley 3 connected to a shaft of a compressor of an air conditioner or the like are supported so as to freely rotate with a prescribed distance between the shafts spaced. Then, the V-ribbed belt 4 is wound between the first pulley 2 and the second pulley 3, so that a power of the crank shaft of the engine or the like is transmitted to the shaft of the compressor through the first pulley 2, the V-ribbed belt 4, and the second pulley 3 in this order so as to rotate the compressor. In the present embodiment, the distance between the shafts of the first pulley 2 and the second pulley 3 cannot be changed. Further, so-called automatic tensioner (a tension applying unit), which applies a tension to the V-ribbed belt 4, is not mounted.

(Structures of First Pulley 2 and Second Pulley 3)

The first pulley 2 has a pulley groove (a groove provided in an outer peripheral part of the first pulley 2) which can be fitted to a rib 4a formed in an inner peripheral surface of the V-ribbed belt 4. Further, to a boss part 2c formed in a central part of the first pulley 2, the crank shaft of the engine or the like is inserted.

Figure 2:
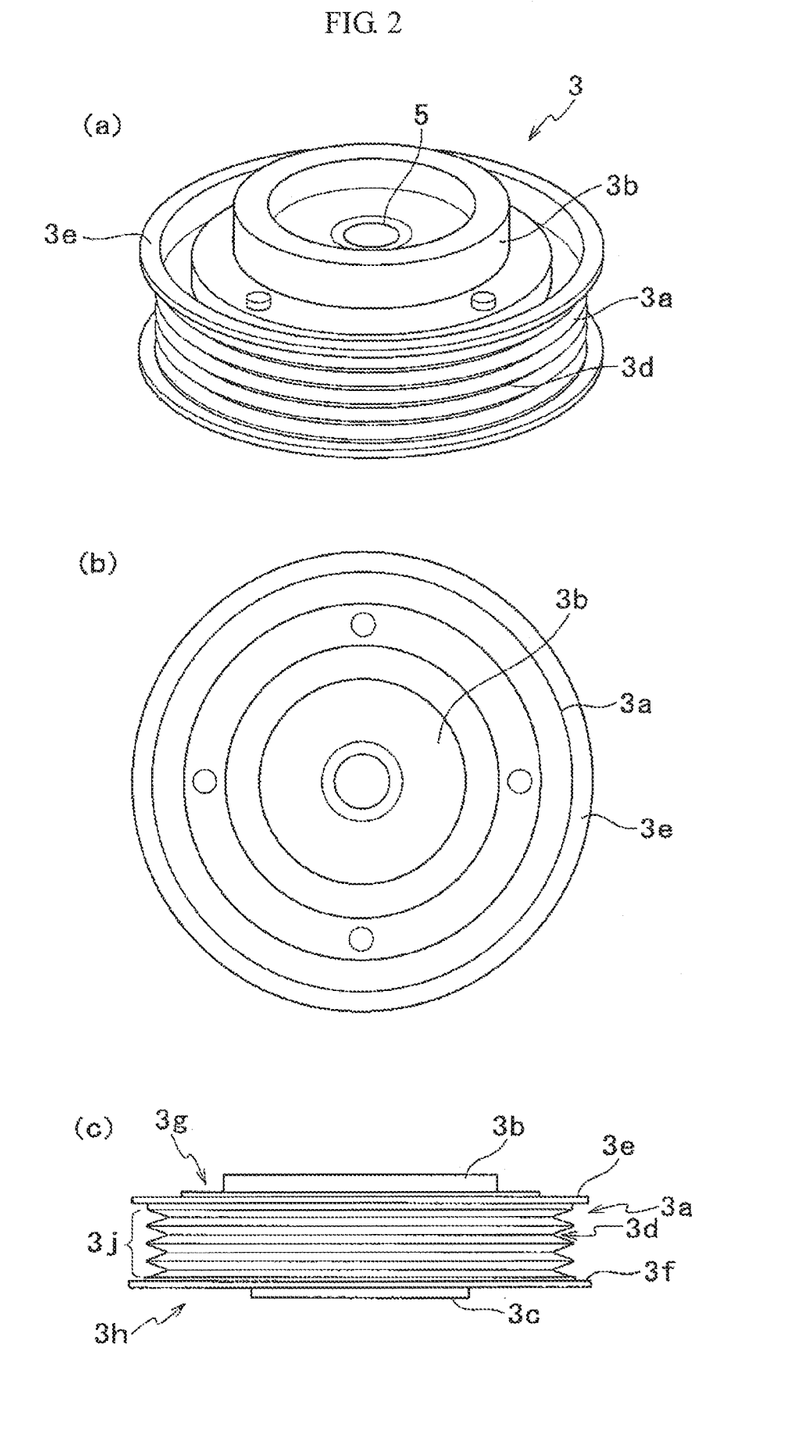
FIG. 2 (a) to (c) of FIG. 2 are explanatory views of the second pulley.

On the other hand, as illustrated in (a) to (c) of FIG. 2, the second pulley 3 includes a compressor pulley 3a, a clutch hub 3b arranged in one side surface of the compressor pulley 3a and a stator 3c arranged in the other side surface of the compressor pulley 3a. The compressor pulley 3a and the stator 3c are fitted to the shaft of the compressor so as to freely rotate. The clutch hub 3b is fixed to the shaft of the compressor. As illustrated in (c) of FIG. 2, the clutch hub 3b of the second pulley 3 is arranged so as to protrude from a side surface 3g of the compressor pulley 3a. The clutch hub 3b corresponds to a protrusion protruding in an axial direction of the second pulley 3.

Then, in the second pulley 3, when the compressor is not driven, only the compressor pulley 3a is rotated. However, for instance, when a switch of the air conditioner is turned on, an electric current is supplied to a coil embedded in the stator 3c, which becomes a powerful magnet to strongly attract the clutch hub 3b, so that the clutch hub 3b is pressed against the compressor pulley 3a. Thus, the clutch hub 3b, the compressor pulley 3a and the stator 3c are integrated to transmit the rotation of the compressor pulley 3a to the shaft of the compressor from the integrated clutch hub 3b, so that the compressor is rotated.

Further, as illustrated in FIG. 2, the compressor pulley 3a of the second pulley 3 has a pulley groove 3d (a groove provided in an outer peripheral part 3j of the second pulley) which can be fitted to the rib 4a formed in the inner peripheral surface of the V-ribbed belt 4 and includes a pair of pulley flanges 3e and 3f which hold the pulley groove 3d in the axial direction of the pulley. The pulley flanges 3e and 3f are formed so as to slightly protrude outward from the pulley groove 3d in the radial direction of the second pulley 3 in a side view of (c) of FIG. 2. Further, to a boss part 5 of the second pulley 3, the shaft of the compressor is inserted and fixed to the clutch hub 3b. Reference numerals 3g and 3h illustrate side surfaces of the second pulley 3.

(V-Ribbed Belt 4)

The V-ribbed belt 4 is so-called low modulus belt which is a little extensible in a direction of a circumferential length thereof. Since a polyamide fiber is used for a tension member, the low modulus belt has a relatively low modulus of elasticity. Thus, a sudden deterioration of tension is more suppressed than that having a high modulus of elasticity (so-called high modulus belt).

Further, an arrow mark V of a thick line in (a) of FIG. 1 indicates a running direction of the V-ribbed belt 4. A rotating direction of the second pulley 3 when the V-ribbed belt 4 is driven in the running direction is defined as a first rotating direction A and an opposite direction to the first rotating direction A is defined as a second rotating direction B.

(Structure of Belt Installation Tool 9)

Next, referring to FIG. 3 and FIG. 4, a structure of the belt installation tool 9 according to the present embodiment will be described.

Figure 3:
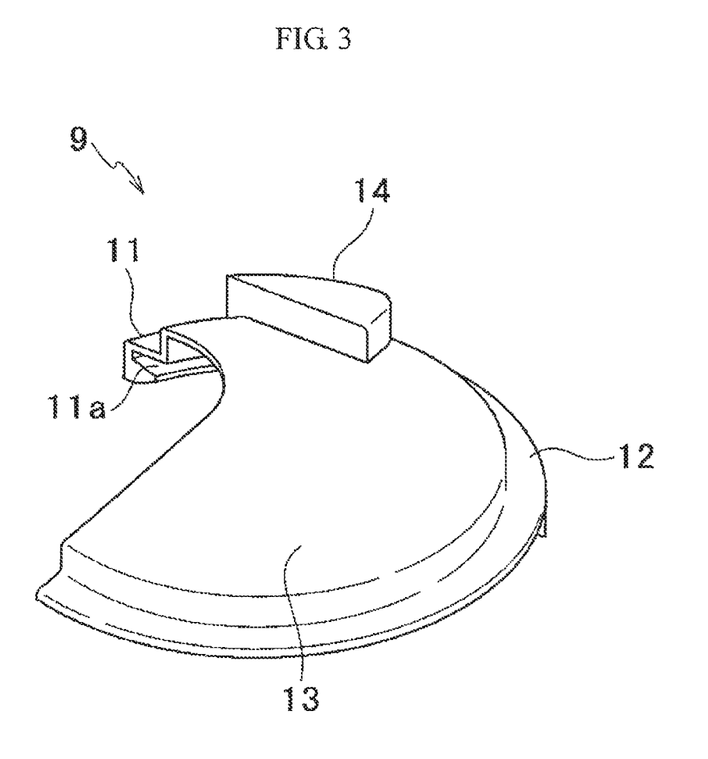
FIG. 3 is a perspective view of a belt installation tool according to the present embodiment.
Figure 4:
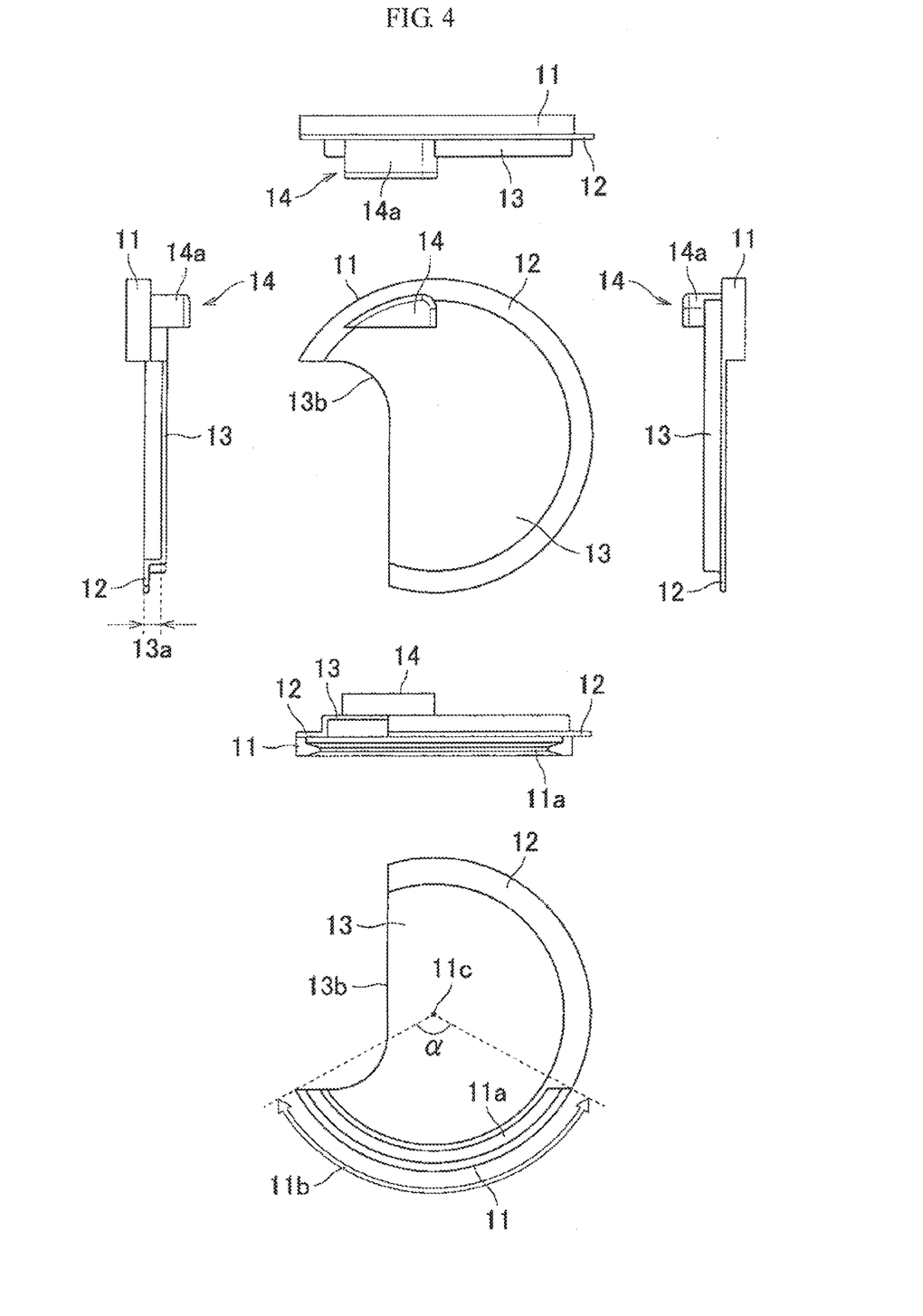
FIG. 4 illustrates hexahedral views of the belt installation tool according to the present embodiment.

As illustrated in FIG. 3 and FIG. 4, the belt installation tool 9 includes, as a main structure, an attaching part 11 attached along the outer peripheral part 3j of the second pulley 3, an installation part 12 which is brought into contact with the pulley flange 3e part of the one side surface 3g of the second pulley 3, a protection part 13 which covers the clutch hub 3b (the protrusion) of the second pulley 3, and a belt holding part 14 provided on the protection part 13.

The attaching part 11 is configured in a circular arc form (a curved form) so as to extend along the outer peripheral part 3j of the compressor pulley 3a of the second pulley 3. Further, in an inner peripheral surface side of the attaching part 11, provided is a rib 11a (a rib part) which is fitted to the pulley groove 3d provided in the outer peripheral part 3j of the compressor pulley 3a of the second pulley 3. Further, a circular arc length 11b of the attaching part 11 is formed in such a way that a central angle $\alpha$ in a central part 11c of a circular arc is 120° as illustrated in FIG. 4.

In the present embodiment, the central angle $\alpha$ is set to be 120°. However, the central angle $\alpha$ of the circular arc length 11b may be set to be within a range of 30 to 120° (preferably, 30 to 90°). As one of reasons thereof, there can be mentioned that when the central angle $\alpha$ of the circular arc length 11b of the attaching part 11 is formed to be smaller than 30° (the central angle $\alpha < 30°$), the circular arc length 11b of the attaching part 11 is relatively short to an outer peripheral length of the outer peripheral part 3j of the compressor pulley 3a of the second pulley 3, and therefore there is a possibility that the installation of the belt installation tool 9 on the second pulley 3 is not stable. Further, as another of the reasons thereof, there can be mentioned that when the central angle $\alpha$ of the circular arc length 11b of the attaching part 11 is formed to exceed 120° (the central angle $\alpha > 120°$), the circular arc length 11b of the attaching part 11 is relatively long to the outer peripheral length of the outer peripheral part 3j of the compressor pulley 3a of the second pulley 3, and therefore there is a possibility that the installation or disinstallation of the belt installation tool 9 on or from the second pulley 3 is not easy.

The rib 11a is formed with one protruding rib along a longitudinal direction of the inner peripheral surface of the attaching part 11. When the belt installation tool 9 is attached to the second pulley 3, the rib 11a is fitted to the pulley groove 3d of the compressor pulley 3a, so that the belt installation tool 9 can be accurately fixed to the outer peripheral part 3j of the compressor pulley 3a. The present embodiment is configured to have only one rib 11a provided. In order to form the rib 11a, at least one protruding rib may be provided, and, a plurality of ribs 11a may be provided.

Figure 6:
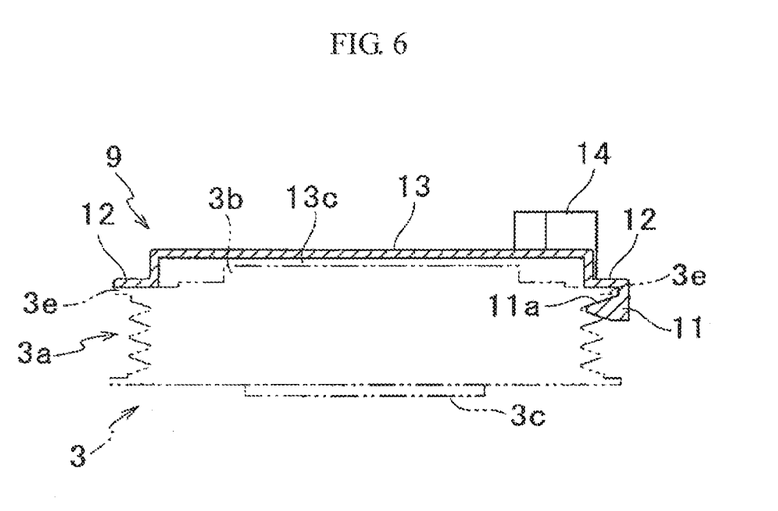
FIG. 6 is an A-A cross-sectional view at the time when the belt installation tool according to the present embodiment is attached to the second pulley.

The installation part 12 is extended from one end of the attaching part 11 to the boss part 5 of the second pulley 3. A width of the installation part 12 extending toward a direction of the boss part 5 corresponds to a width of the pulley flange 3e as illustrated in FIG. 6. The installation part 12 is attached on or comes into close contact with the pulley flange 3e provided in the compressor pulley 3a of the second pulley 3 at the time when the belt installation tool 9 is attached to the second pulley 3, and it serves to stabilize the belt installation tool 9 to the second pulley 3.

The protection part 13 has, as illustrated in FIG. 4, a partly cut-out part 13b provided from a circular form and is configured to have a step 13a relative to the installation part 12. Namely, in the present embodiment, the installation part 12 is connected to the protection part 13 in a stepped form through the step 13a. As illustrated in FIG. 6, the step 13a of the protection part 13 serves to form a gap 13c between the protection part 13 and the clutch hub 3b of the second pulley 3 at the time when the belt installation tool 9 is attached to the second pulley 3, so as to suppress the protection part 13 from coming into contact with the clutch hub 3b. In such a way, the protection part 13 serves to cover the clutch hub 3b while avoiding from coming into contact with the clutch hub 3b. In the present embodiment, the step 13a is provided between the installation part 12 and the protection part 13, however, the installation part 12 and the protection part 13 may be continuously curved without providing the step 13a.

Here, the protection part 13 is provided so as to cover at least a part of a part which has the largest distance in a vertical direction from a plane defined by a part with which the installation part 12 comes into contact in the one side surface 3g of the second pulley 3 in an area located inside the part with which the installation part 12 comes into contact in the one side surface 3g (the side surface of a side which is covered with the protection part 13) of the second pulley 3. Namely, in the present embodiment, it is provided so as to cover at least a part of the clutch hub 3b as the protrusion protruding most outward in the axial direction in the area located inside the pulley flange 3e. The protection part 13 preferably covers at least a substantial center of the side surface 3g of the second pulley 3. Namely, in the present embodiment, it preferably covers the boss part 5. As a covering ratio, the protection part 13 preferably covers, for instance, half or more of the side surface 3g (the side surface of the side which is covered with the protection part 13) of the second pulley 3. Namely, the protection part 13 preferably covers 50 to 100% (the central angle of 180° to 360°) as large as the side surface 3g of the second pulley 3. When the covering ratio is smaller than 50%, the V-ribbed belt 4 severely interferes with the second pulley 3 during an attachment of the V-ribbed belt 4, so that at least one of them may be probably damaged.

Further, since the size of the gap 13c is suitably set depending on properties of an applied pulley (a misalignment limit or the like), it is not especially limited, however, for instance, it preferably exceeds 0 mm and is about 3.5 mm or smaller.

Further, in the attaching part 11, the installation part 12 and the protection part 13, parts which come into contact with the V-ribbed belt 4 are chamfered to have curved configurations. They are provided so as not to damage the V-ribbed belt 4 at the time when the V-ribbed belt 4 is wound on the second pulley 3 by using the belt installation tool 9.

As illustrated in FIG. 4, the belt holding part 14 is provided to protrude on the protection part 13 and arranged so as to be located in the outer peripheral part 3j side of the compressor pulley 3a at the time when the belt installation tool 9 is attached to the second pulley 3. The belt holding part 14 serves to temporarily hold the V-ribbed belt 4 at the time when the V-ribbed belt 4 is wound on the second pulley 3. As in the present embodiment, a part of the belt holding part 14 may be provided in the installation part 12.

Figure 7:
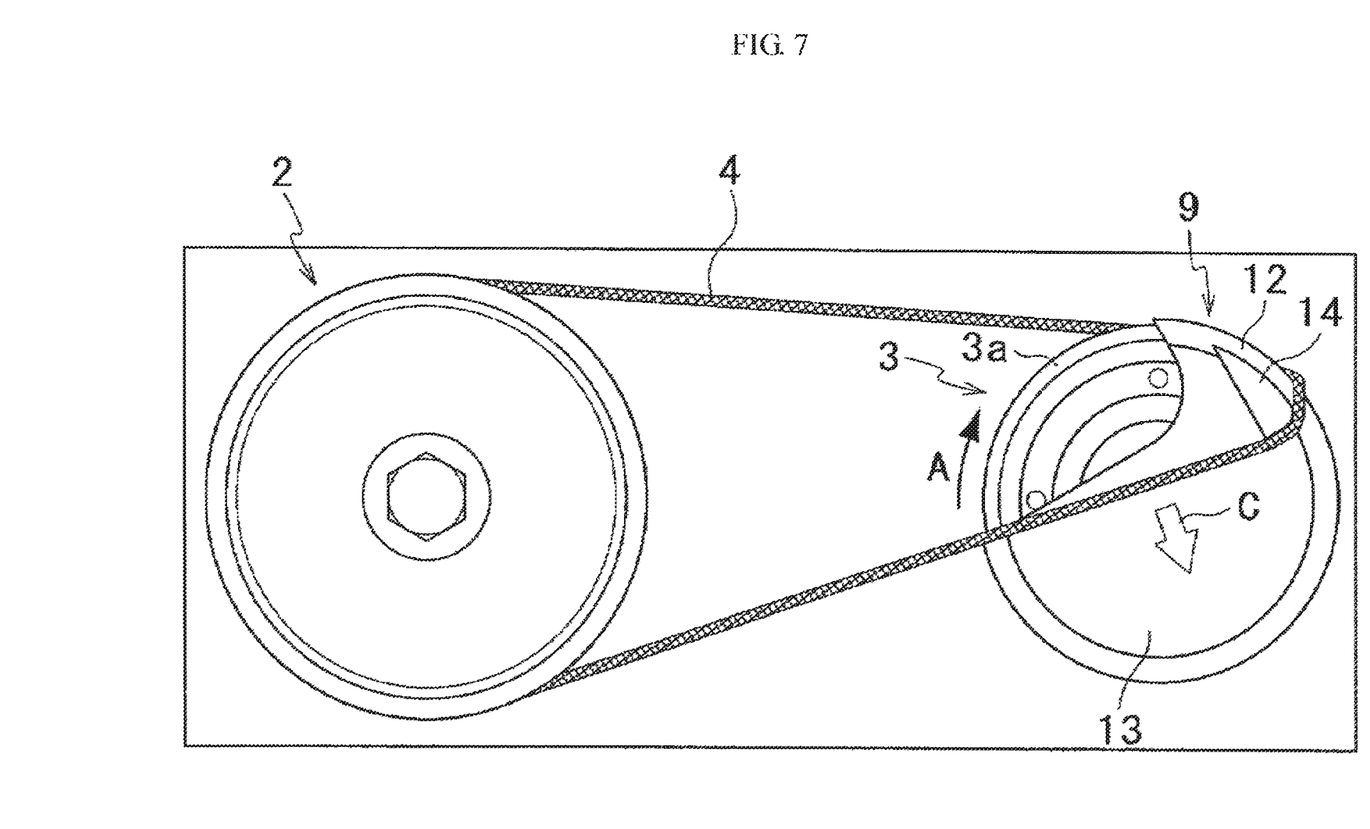
FIG. 7 is a second explanatory view of the using method of the belt installation tool according to the present embodiment.
Figure 8:
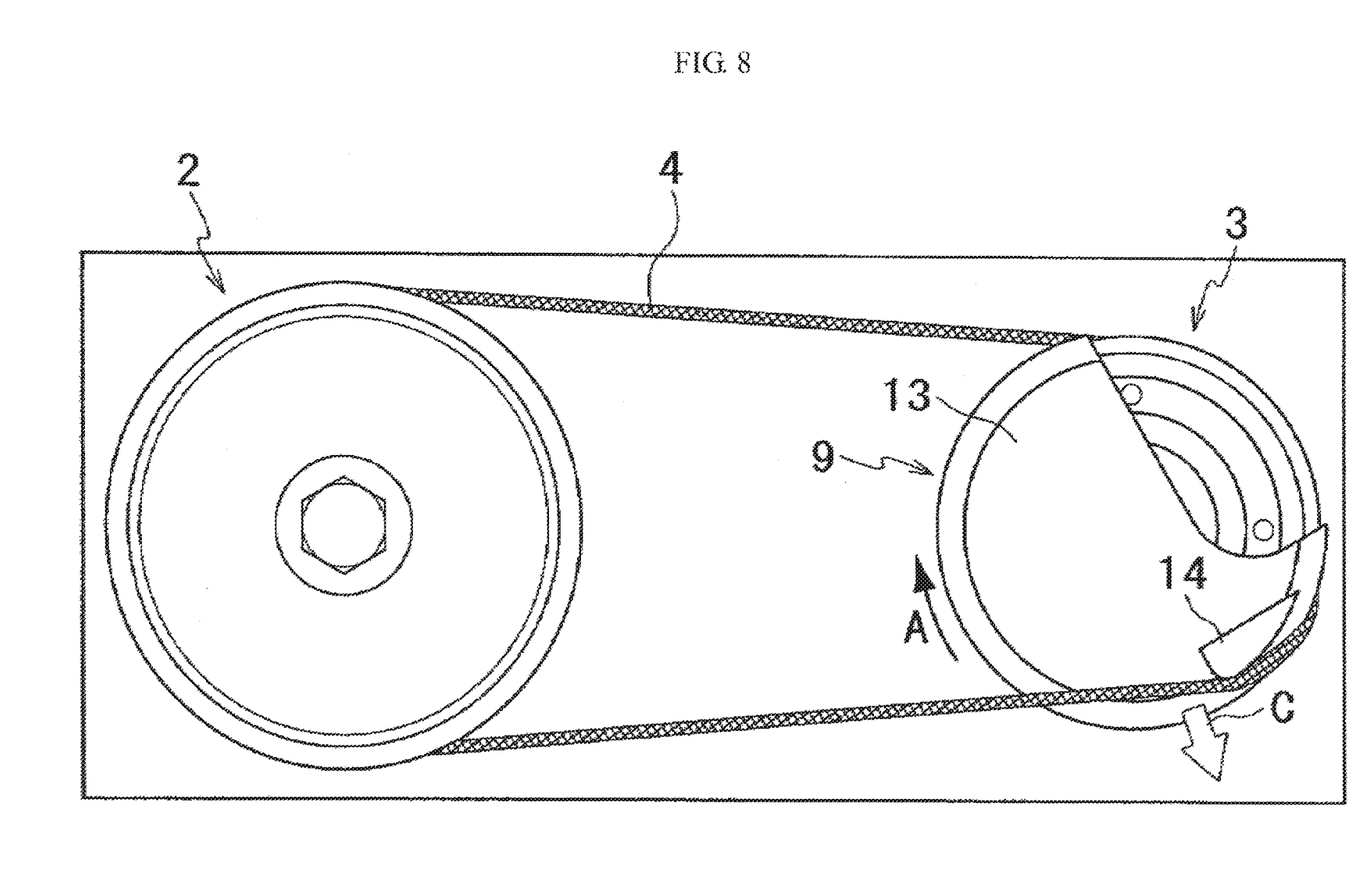
FIG. 8 is a third explanatory view of the using method of the belt installation tool according to the present embodiment.
Figure 9:
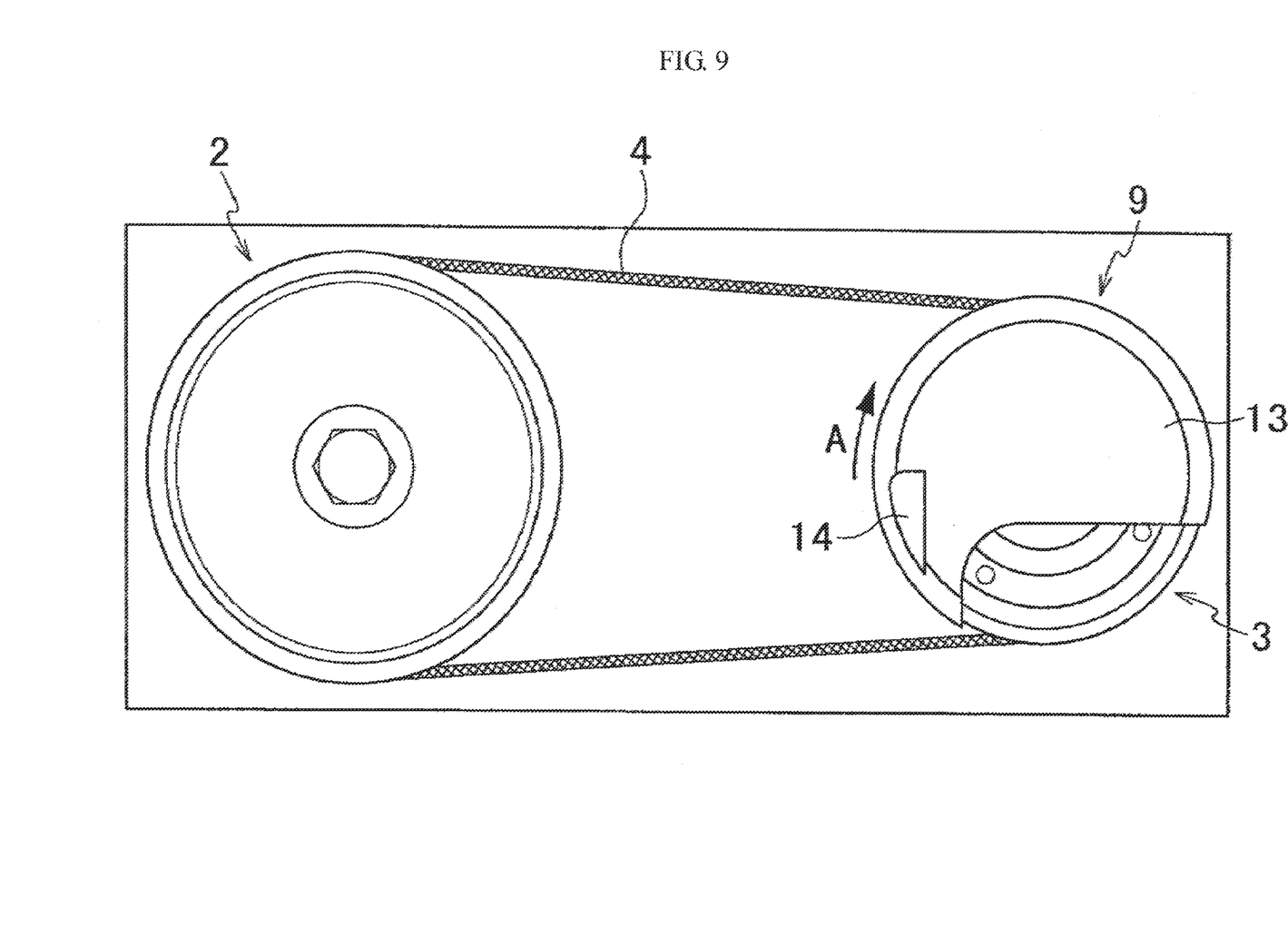
FIG. 9 is a fourth explanatory view of the using method of the belt installation tool according to the present embodiment.

More specifically, as illustrated in FIG. 7 to FIG. 9, the belt holding part 14 protrudes in such a way that when the V-ribbed belt 4 is introduced to the outer peripheral part 3j of the compressor pulley 3a through the belt holding part 14, an inner peripheral surface of the V-ribbed belt 4 comes into contact with a holding surface 14a of the belt holding part 14 and a side surface of the V-ribbed belt 4 comes into contact with the protection part 13 so that a stepped part is formed between a position of the V-ribbed belt 4 held by the belt holding part 14 and a position of the V-ribbed belt 4 introduced to the outer peripheral part 3j of the compressor pulley 3a. The belt holding part 14 serves to bend the V-ribbed belt 4 and extend it along the outer peripheral part 3j of the compressor pulley 3a at the time when the V-ribbed belt 4 is wound on the second pulley 3. In the belt holding part 14, the part which comes into contact with the V-ribbed belt 4 at the time of winding the V-ribbed belt 4 is chamfered to have a curved configuration. This is provided so as not to damage the V-ribbed belt 4 at the time of winding the V-ribbed belt 4.

(Using Method of Belt Installation Tool 9)

Next, referring to FIG. 5 to FIG. 9, a using method of the above-described belt installation tool 9 will be described. A wrench is connected to the boss part 2c of the first pulley 2 so that the first pulley 2 can be manually and freely rotated.

<Procedure (a)>

Figure 5:
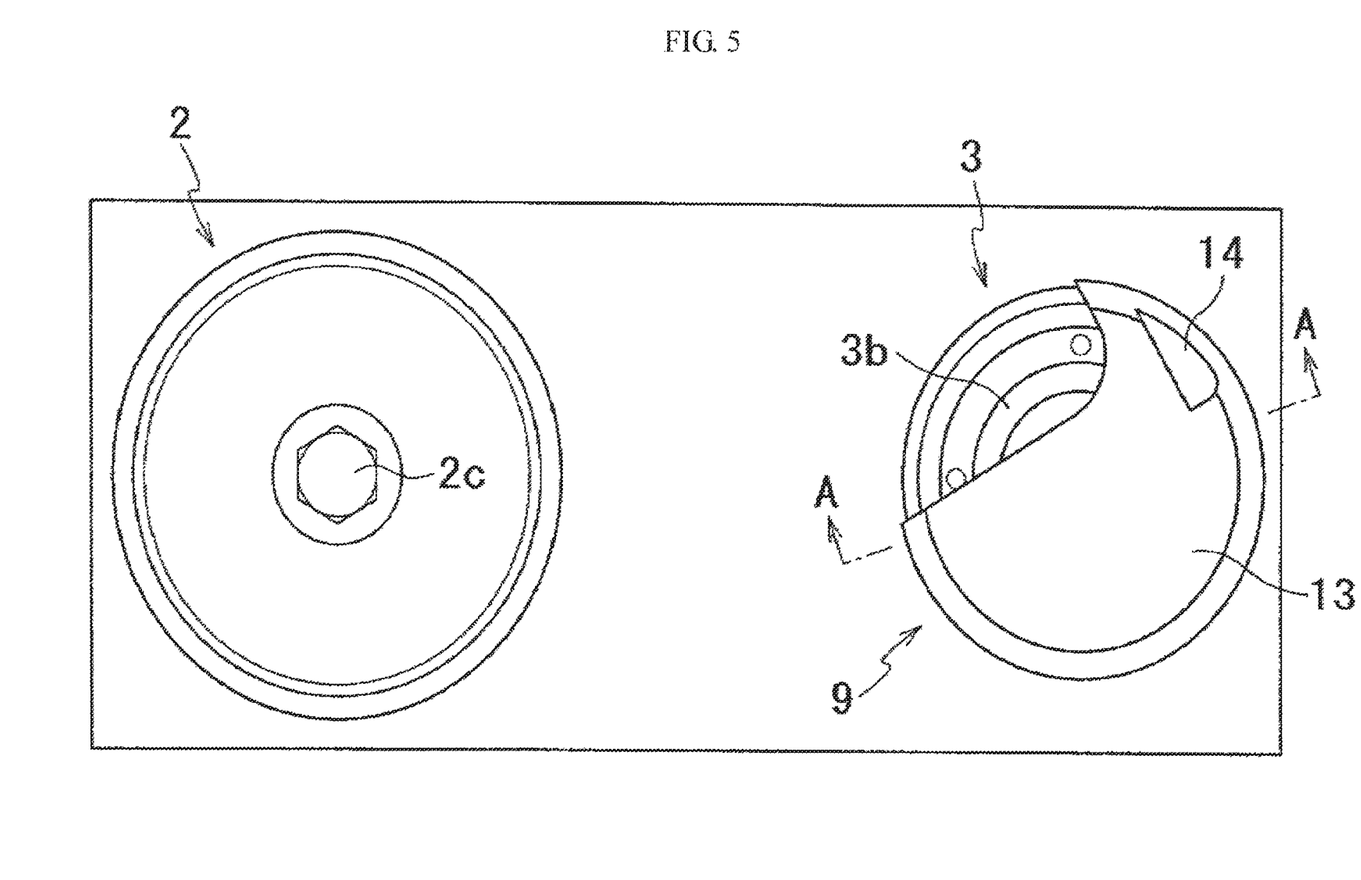
FIG. 5 is a first explanatory view of a using method of the belt installation tool according to the present embodiment.

Initially, as illustrated in FIG. 5, the belt installation tool 9 is attached to the second pulley 3 so that the attaching part 11 is extended along the outer peripheral part 3j of the compressor pulley 3a of the second pulley 3. At this time, the rib 11a provided in the attaching part 11 is fitted to the pulley groove 3d of the compressor pulley 3a and the installation part 12 is brought into contact with the pulley flange 3e provided in the compressor pulley 3a. Thus, the protection part 13 is in a state to cover the clutch hub 3b while forming the gap 13c with respect to the clutch hub 3b (see an A-A cross-sectional view of FIG. 6).

<Procedure (b)>

Under this state, as illustrated in FIG. 7, the V-ribbed belt 4 is wound on the first pulley 2. Then, after the V-ribbed belt 4 is extended along the outer peripheral part 3j of the compressor pulley 3a of the second pulley 3, it is allowed to step over the attaching part 11 and the installation part 12, bent on an edge of the belt holding part 14 and wound so that the inner peripheral surface of the V-ribbed belt 4 comes into contact with the belt holding part 14. At this time, as illustrated in FIG. 7, the V-ribbed belt 4 bent by the belt holding part 14 is in a state to be wound on the first pulley 2 while passing on the protection part 13.

<Procedure (c)>

Then, as illustrated in FIG. 7, the first pulley 2 and the second pulley 3 is rotated by using the wrench in the first rotating direction A.

Specifically, the first pulley 2 and the second pulley 3 are first rotated in the first rotating direction A so as to have a state illustrated in FIG. 8 from the state illustrated in FIG. 7. Then, the V-ribbed belt 4 is stretched and a high tension is generated. Since the V-ribbed belt 4 crosses on the attaching part 11, the tension serves as a pressing action which presses the attaching part 11 against the outer peripheral part 3j of the second pulley 3. Thus, the belt installation tool 9 is more strongly fixed to the second pulley 3.

Further, when the first pulley 2 and the second pulley 3 are rotated in the first rotating direction A so as to obtain the state illustrated in FIG. 8 from the state illustrated in FIG. 7, the V-ribbed belt 4 on the protection part 13 slides to a direction C in accordance with the rotation. Then, the V-ribbed belt 4 wound on the belt holding part 14 of the belt installation tool 9 moves to the outer peripheral part 3j of the compressor pulley 3a. Specifically, when the second pulley 3 is rotated in the first rotating direction A, an area where the rib 4a of the V-ribbed belt 4 is fitted to the pulley groove 3d of the compressor pulley 3a of the second pulley 3 is gradually increased.

Further, the first pulley 2 and the second pulley 3 are rotated in the first rotating direction A so as to obtain a state illustrated in FIG. 9 from the state illustrated in FIG. 8. Then, the V-ribbed belt 4 remaining on the protection part 13 departs from the protection part 13 and completely moves to the outer peripheral part 3j of the compressor pulley 3a of the second pulley 3. After the movement, the belt installation tool 9 is recovered from the second pulley 3.

Through the above-described procedures, the V-ribbed belt 4 can be wound between the first pulley 2 and the second pulley 3 as illustrated in FIG. 1.

As described above, in the belt installation tool 9 according to the present embodiment, since the attaching part 11 is attached along the outer peripheral part 3j of the compressor pulley 3a of the second pulley 3 and the installation part 12 is fixed to come into contact with the pulley flange 3e of the compressor pulley 3a of the second pulley 3, the belt installation tool 9 can be stably installed on the second pulley 3.

Further, the protection part 13 covers at least a part of the clutch hub 3b as the protrusion protruding most outward in the axial direction in the area located inside the pulley flange 3e. Thus, at the time when the V-ribbed belt 4 is wound on the second pulley 3, the clutch hub 3b is prevented from interfering with the V-ribbed belt 4, so that the clutch hub 3b and the V-ribbed belt 4 can be protected.

Further, since the belt holding part 14 protrudes near the outer peripheral part of the second pulley 3 on the protection part 13, the belt holding part 14 does not protrude outside (outside in a radial direction) from the outer peripheral part 3j. Thus, even in the case where there is no room in a physical space outside in the radial direction of the second pulley 3, it can be used.

Then, when the belt installation tool 9 is installed on the second pulley 3 and the V-ribbed belt 4 is moved to the outer peripheral part 3j of the second pulley 3 from the state that the V-ribbed belt 4 is wound on the belt holding part 14, the V-ribbed belt 4 can be smoothly slid and moved on the protection part 13. Thus, when the V-ribbed belt 4 is moved to the outer peripheral part 3j of the second pulley 3 from the state that the V-ribbed belt 4 is wound on the belt holding part 14, the V-ribbed belt 4 is prevented from being interfered with the clutch hub 3b of the second pulley 3, so that the V-ribbed belt 4 and the second pulley 3 itself can be prevented from being damaged.

Further, according to the above-described configuration, the protection part 13 is connected to the installation part 12 in the stepped form by providing the step 13a therebetween so that the gap 13c may be formed by the step 13a between the clutch hub 3b and the protection part 13. Thus, the protection part 13 can reliably cover the clutch hub 3b without coming into contact with the clutch hub 3b.

Further, according to the above-described configuration, since the attaching part 11 is configured in a circular arc form so as to extend along the outer peripheral part 3j of the compressor pulley 3a of the second pulley 3, the belt installation tool 9 can be stably attached to the outer peripheral part 3j of the second pulley 3.

Further, according to the above-described configuration, since the attaching part 11 is provided with the rib 11a which is fitted to the pulley groove 3d provided in the outer peripheral part 3j of the compressor pulley 3a of the second pulley 3, the belt installation tool 9 can be more stably attached to the outer peripheral part 3j of the second pulley 3.

Further, as described above, when the circular arc length 11b of the attaching part 11 is formed to have a central angle α being within a range of 30 to 120°, the installation or disinstallation of the belt installation tool 9 on or from the second pulley 3 can be made easy while stabilizing the installation of the belt installation tool 9 on the second pulley 3.

OTHER EMBODIMENTS

Figure 10:
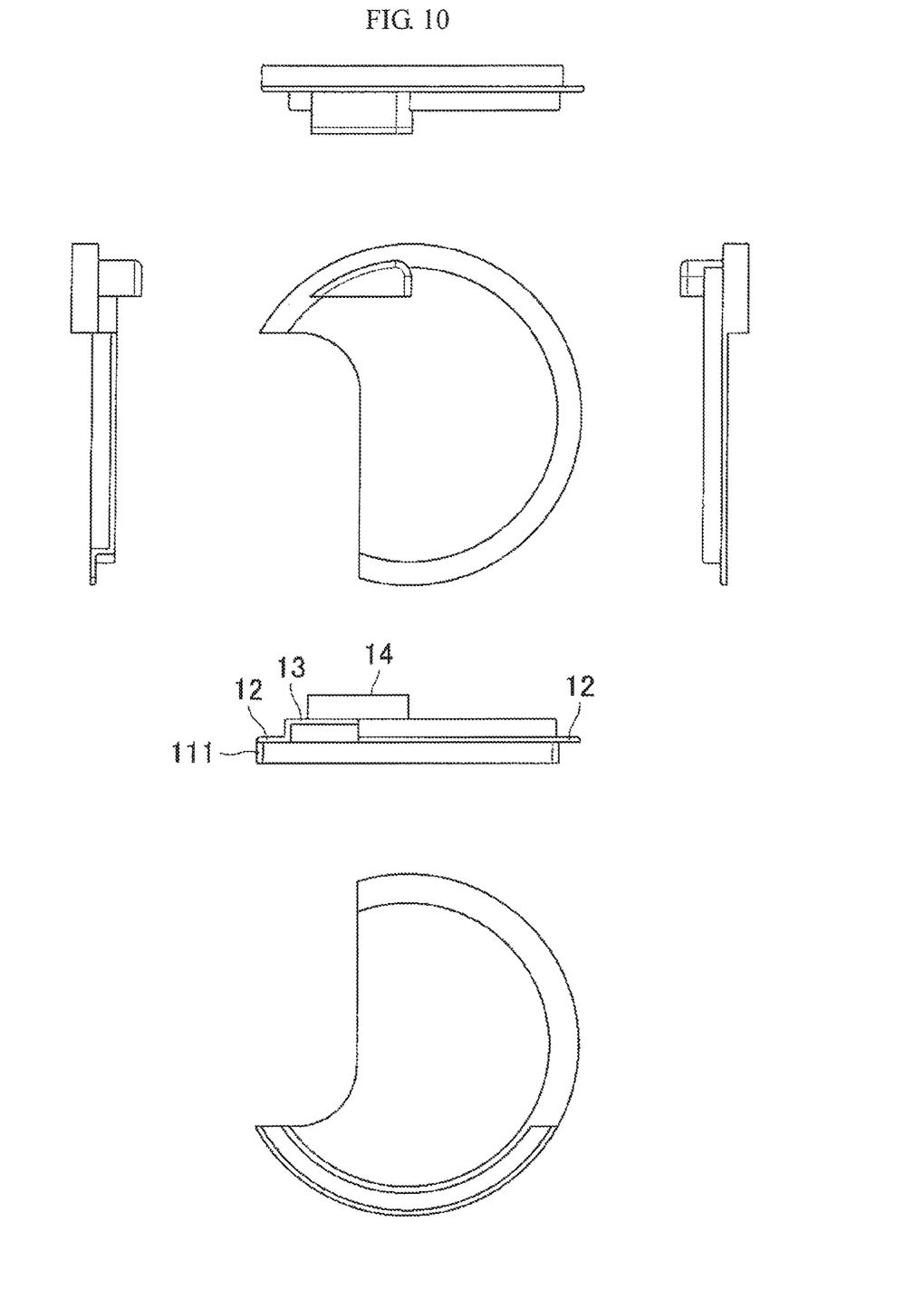
FIG. 10 illustrates hexahedral views of a belt installation tool according to another embodiment.

The belt installation tool 9 according to the above-described embodiment has the structure that the rib 11a is provided in the inner peripheral surface side of the attaching part 11. However, as illustrated in FIG. 10, a rib may not be provided in an inner peripheral surface side of an attaching part 11. In this case, since no rib is provided, a production cost can be reduced. Further, stability at the time when the belt installation tool 9 is attached to the second pulley 3 can be secured in such a way that an attaching part 111 having no rib is brought into contact with the outer peripheral part 3j of the second pulley 3 and an installation part 12 is brought into contact with the pulley flange 3e.

Figure 11:
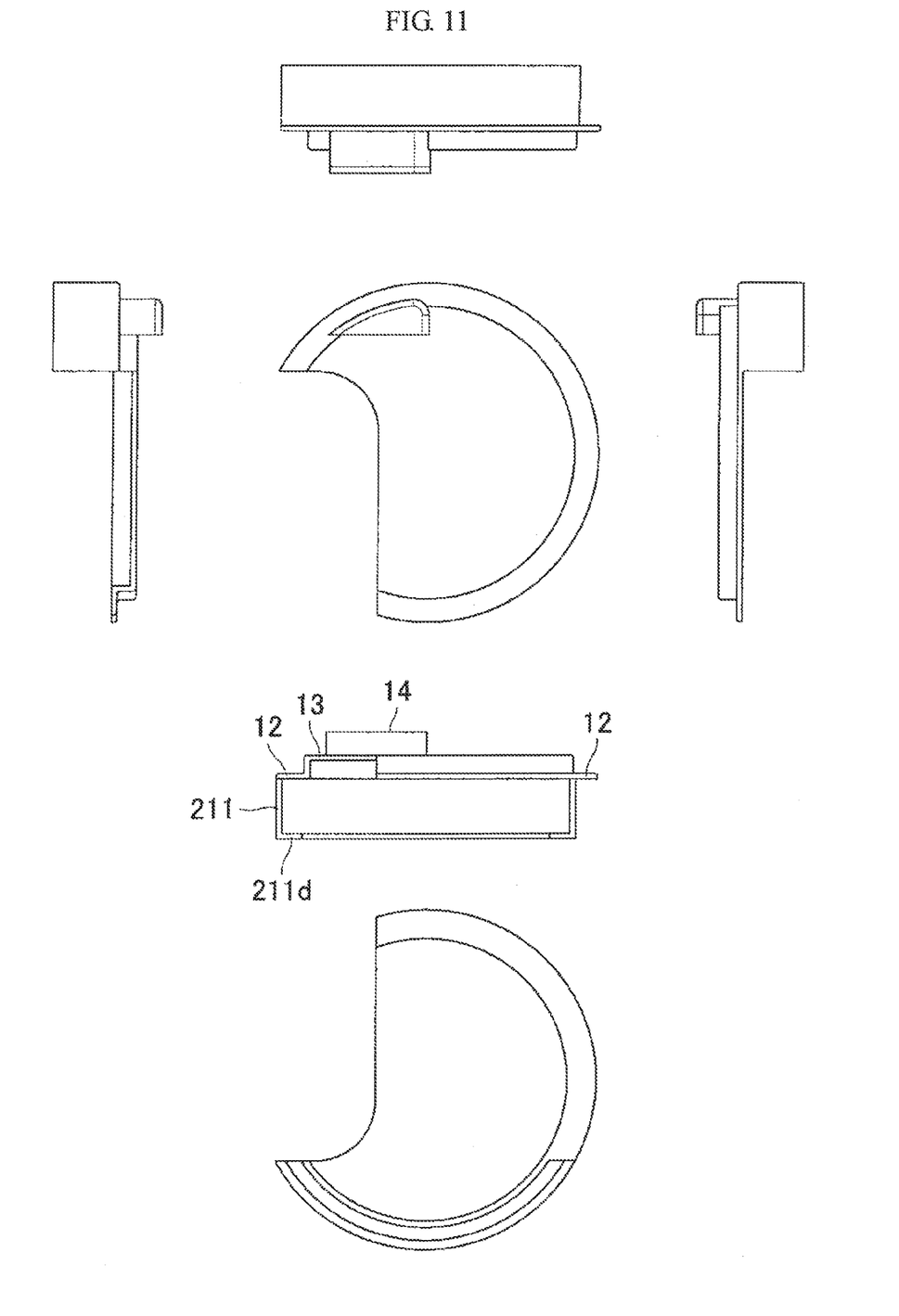
FIG. 11 illustrates hexahedral views of a belt installation tool according to another embodiment.

Further, as illustrated in FIG. 11, an attaching part 211 of a belt installation tool 9 may be formed to have such a width as to cover the outer peripheral part 3j of the compressor pulley 3a in a width direction (a width in an axial direction of the second pulley 3). In this case, in the attaching part 211, a contact part 211d which comes into contact with a pulley flange 3f of the compressor pulley 3a may be provided. By providing the contact part 211d, the installation of the belt installation tool 9 on the second pulley 3 can be made more stable. Further, in an inner peripheral surface side of the attaching part 211 illustrated in FIG. 11, one or a plurality of ribs may be formed.

In the above-described embodiment, described is a case where the belt installation tool 9 is used to be attached to the second pulley 3 having the clutch hub 3b as the protrusion. However, the belt installation tool 9 can be used by being installed on a pulley in which a distance from a plane defined by a part with which the installation part 12 comes into contact in a side surface 3g of the second pulley 3 is "0", that is, the pulley having no protrusion.

While the embodiments of the present invention are described above, the present invention is not limited to the above-described embodiments and may be variously changed and embodied within a range which is described in the scope of claims.

The present application is based on Japanese patent Application No. 2013-128410 filed on Jun. 19, 2013 and Japanese Patent Application No. 2014-122363 filed on Jun. 13, 2014 and contents thereof are incorporated herein by reference.

DESCRIPTION OF REFERENCE NUMERALS AND SIGNS

1 Casing
2 First pulley
3 Second pulley
3a Compressor pulley
3b Clutch hub
3c Stator 4 V-ribbed belt
9 Belt installation tool
11 Attaching part
11a Rib
12 Installation part
13 Protection part
13a Step
14 Belt holding part
A First rotating direction

The invention claimed is:

1. A belt installation tool which is to be installed so as to cover at least a part of a first side surface of a pulley, the belt installation tool comprising:
    an attaching part that is attached along an outer peripheral part of the pulley, the outer peripheral part of the pulley facing away from a center of the pulley in a radial direction,
    an installation part having an installation part contact surface that is brought into contact with at least a first part of the first side surface of the pulley,
    a protection part that covers at least a second part of the first side surface without contacting the first side surface of the pulley, and
    a belt holding part that protrudes from the protection part at a radial position closer to the outer peripheral part of the pulley than to a center of the pulley, or from the installation part,
    wherein the protection part covers at least a part of the pulley having a largest distance, in a rotational axis direction of the pulley, from a plane defined by the first part of the first side surface, the part of the pulley being disposed within the first part of the first side surface of the pulley in the radial direction, and
    wherein the belt holding part does not extend, in the radial direction, beyond a radially outermost portion of the attaching part.

2. The belt installation tool according to claim 1, wherein the installation part is connected to the protection part in a stepped form.

3. The belt installation tool according to claim 1, wherein the attaching part has a circular arc form so as to extend along the outer peripheral part of the pulley.

4. The belt installation tool according to claim 3, wherein the attaching part further comprises a rib part which is fitted to a groove part provided in the outer peripheral part of the pulley.

5. The belt installation tool according to claim 3, wherein the attaching part has a circular arc length formed to have a central angle being within a range of 30° to 120°.

6. The belt installation tool according to claim 1, wherein the pulley has a protrusion on the first side surface and the protection part covers at least a part of the protrusion.

7. The belt installation tool according to claim 1, wherein the belt holding part does not extend, in the radial direction, beyond the outer peripheral part of the pulley.

* * * * *